United States Patent
Äärilä et al.

(10) Patent No.: US 10,899,942 B2
(45) Date of Patent: Jan. 26, 2021

(54) PROCESS FOR PRODUCING A COATED PIPE

(71) Applicant: BOREALIS AG, Vienna (AT)

(72) Inventors: Jari Äärilä, Porvoo (FI); Jarmo Kela, Porvoo (FI); Jouni Purmonen, Porvoo (FI)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 16/337,630

(22) PCT Filed: Sep. 20, 2017

(86) PCT No.: PCT/EP2017/073755
§ 371 (c)(1),
(2) Date: Mar. 28, 2019

(87) PCT Pub. No.: WO2018/060029
PCT Pub. Date: Apr. 5, 2018

(65) Prior Publication Data
US 2020/0032095 A1  Jan. 30, 2020

(30) Foreign Application Priority Data
Sep. 28, 2016 (EP) .................................. 16190968

(51) Int. Cl.
| C09D 123/08 | (2006.01) |
| B05D 1/26 | (2006.01) |
| B05D 7/14 | (2006.01) |
| B05D 7/00 | (2006.01) |
| C08F 210/16 | (2006.01) |
| F16L 58/10 | (2006.01) |

(52) U.S. Cl.
CPC ....... *C09D 123/0815* (2013.01); *B05D 1/265* (2013.01); *B05D 7/146* (2013.01); *B05D 7/5883* (2013.01); *C08F 210/16* (2013.01); *F16L 58/10* (2013.01)

(58) Field of Classification Search
None
See application file for complete search history.

(56) References Cited

U.S. PATENT DOCUMENTS

| 3,324,093 A | 6/1967 | Alleman |
| 3,405,109 A | 10/1968 | Rohlfing |
| 4,582,816 A | 4/1986 | Miro |
| 4,588,790 A | 5/1986 | Jenkins, III et al. |
| 4,877,587 A | 10/1989 | Rhee et al. |
| 4,994,534 A | 2/1991 | Rhee et al. |
| 5,391,654 A | 2/1995 | Ahvenainen et al. |
| 5,395,595 A | 3/1995 | Hamalainen |

FOREIGN PATENT DOCUMENTS

| EP | 47077 A1 | 3/1982 |
| EP | 75049 A1 | 3/1983 |
| EP | 428054 A1 | 5/1991 |
| EP | 479186 A2 | 4/1992 |
| EP | 628343 A1 | 12/1994 |
| EP | 683176 A1 | 11/1995 |
| EP | 688794 A1 | 12/1995 |
| EP | 699213 A1 | 3/1996 |
| EP | 810235 A2 | 12/1997 |
| EP | 837915 A1 | 4/1998 |
| EP | 0887379 A1 | 12/1998 |
| EP | 1316598 A1 | 6/2003 |
| EP | 1415999 A1 | 5/2004 |
| EP | 1600276 A1 | 11/2005 |
| EP | 1655334 A1 | 5/2006 |

(Continued)

OTHER PUBLICATIONS

Heino et al., "Rheological Characterization of Polyethylene Fractions", Theoretical and Applied Rheology, Proc. XIth Int. Congr. on Rheology, Brussels, Belgium, Aug. 17-21, 1992, pp. 360-362.
Heino, et al.,"The Influence of Molecular Structure on Some Rheological Properties of Polyethylene", Annual Transactions of the Nordic Rheology Society, 1995, pp. 71-73.
Notification of Transmittal of the International Search Report and Written Opinion of the International Searching Authority for PCT/EP2017/073755 dated Jan. 19, 2018, 11 pages.
English Translation of Office Action for CN Application No. 201780060293.4 dated Aug. 22, 2019, 9 pages.

*Primary Examiner* — Michael P. Rodriguez
(74) *Attorney, Agent, or Firm* — Lowenstein Sandler LLP

(57) ABSTRACT

The present invention deals with a process for producing a coated pipe. The process comprises (i) homopolymerising ethylene or copolymerising ethylene and an α-olefin comonomer in a first polymerisation step in the presence of a polymerisation catalyst to produce a first ethylene homo- or copolymer having a density of from 940 to 980 kg/m$^3$ and a melt flow rate MFR$_2$ of from 1 to 2000 g/10 min; (ii) homopolymerising ethylene or copolymerising ethylene and an α-olefin comonomer in a second polymerisation step in the presence of a first ethylene homo- or copolymer to produce a first ethylene polymer mixture comprising the first ethylene homo- or copolymer and a second ethylene homo- or copolymer, said first ethylene polymer mixture having a density of from 940 to 980 kg/m$^3$ and a melt flow rate MFR$_2$ of from 10 to 2000 g/10 min; (iii) copolymerising ethylene and an α-olefin comonomer in a third polymerisation step in the presence of the first ethylene polymer mixture to produce a second ethylene polymer mixture comprising the first ethylene polymer mixture and a third ethylene copolymer, said second ethylene polymer mixture having a density of from 915 to 965 kg/m$^3$, preferably from 930 to 955 kg/m$^3$ and a melt flow rate MFR$_5$ of from 0.2 to 10 g/10 min; (iv) providing a pipe having an outer surface layer; (v) applying a coating composition onto the pipe outer surface layer to form a top coat layer, wherein the coating composition comprises the second ethylene polymer mixture.

14 Claims, No Drawings

(56) References Cited

FOREIGN PATENT DOCUMENTS

| | | |
|---|---|---|
| EP | 1859926 A1 | 11/2007 |
| EP | 1865037 A1 | 12/2007 |
| EP | 2072586 A1 | 6/2009 |
| EP | 2072587 A1 | 6/2009 |
| EP | 2072588 A1 | 6/2009 |
| EP | 2072589 A1 | 6/2009 |
| EP | 372239 A2 | 6/2015 |
| EP | 2883885 A1 | 6/2015 |
| EP | 2883887 A1 | 6/2015 |
| GB | 1272778 A | 5/1972 |
| WO | 9212182 A1 | 7/1992 |
| WO | 9428032 A1 | 12/1994 |
| WO | 9501831 A1 | 1/1995 |
| WO | 9517952 A1 | 7/1995 |
| WO | 9619503 A1 | 6/1996 |
| WO | 9632420 A1 | 10/1996 |
| WO | 9703139 A1 | 1/1997 |
| WO | 9924478 A1 | 5/1999 |
| WO | 9924479 A1 | 5/1999 |
| WO | 9951646 A1 | 10/1999 |
| WO | 0068315 A1 | 11/2000 |
| WO | 0155230 A1 | 8/2001 |
| WO | 02088194 A1 | 11/2002 |
| WO | 2004000899 A1 | 12/2003 |
| WO | 2004111095 A1 | 12/2004 |
| WO | 2005118655 A1 | 12/2005 |
| WO | 2006063771 A1 | 6/2006 |
| WO | 2015051881 A1 | 4/2015 |
| WO | WO-2015051881 A1 * | 4/2015 ....... C09D 123/0815 |
| WO | WO-2015086812 A1 * | 6/2015 ............. C08F 2/001 |

* cited by examiner

PROCESS FOR PRODUCING A COATED PIPE

Cross-Reference to Related Applications

This application is a national phase entry under 35 U.S.C. § 371 of International Application No. PCT/EP2017/073755, filed on Sep. 20, 2017, which claims the benefit of priority of European Patent Application No. 16190968.4, filed on Sep. 28, 2016. The contents of these applications are hereby incorporated by reference herein in their entirety.

OBJECTIVE OF THE INVENTION

The present invention is directed to compositions useful in polymer coated pipes and the processes for producing them. More specifically, the present invention is directed to coated metal pipes having improved adhesion, tensile properties and processability. In addition, the present invention is directed to a method of producing such coated metal pipes with a high throughput and good production economy.

TECHNICAL BACKGROUND AND PRIOR ART

The use of bimodal or multimodal ethylene polymers in coating of steel pipes is known from EP-A-837915. However, even though the document teaches that the coatings have good mechanical properties there still exists a need to further improve the slow crack growth resistance and improve the balance between the stiffness and stress cracking resistance of the coating composition.

EP-A-1865037 discloses a coated pipe having a top coat formed of bimodal polyethylene having a density of from 937 to 945 kg/m$^3$. According to the examples the resin was produced in two polymerisation steps.

EP-A-2072586 discloses a coated pipe having a top coat formed of bimodal polyethylene having an MFR$_5$ of from 0.5 to 10 g/10 min and a density of from 930 to 950 kg/m$^3$. According to the examples the resin was produced in two polymerisation steps.

EP-A-2072587 discloses a coated pipe having a top coat formed of bimodal polyethylene having an MFR$_5$ of from 0.5 to 10 g/10 min and a density of from 945 to 958 kg/m$^3$. According to the examples the resin was produced in two polymerisation steps.

EP-A-2072588 discloses a coated pipe having a top coat formed of bimodal polyethylene having an MFR$_5$ of from 0.5 to 10 g/10 min and a density of from 930 to 950 kg/m$^3$ with Mw/Mn of from 15 to 20. According to the examples the resin was produced in two polymerisation steps.

EP-A-2072589 discloses a coated pipe having a top coat formed of bimodal polyethylene having an MFR$_5$ of from 0.5 to 10 g/10 min and a density of from 930 to 950 kg/m$^3$. According to the examples the resin was produced in two polymerisation steps.

Good adhesion is crucial in pipe coating applications. While the adhesive resin and the epoxy influence the adhesion properties, the properties of the top coat resin also have a significant influence. Simultaneously, the top coat resin should have a good processability and good mechanical properties. The objective of the present invention is to produce coatings with improved adhesion and mechanical properties and which can be applied at a high speed.

While the prior art discloses resins having a good processability and good mechanical properties and which are suitable for top coats in coated metal pipes, there is still room for improving the properties and especially the adhesion of the top coat to the pipe.

SUMMARY OF THE INVENTION

As seen from one embodiment of the invention the present invention provides a process for producing a coated pipe comprising the steps of (i) homopolymerising ethylene or copolymerising ethylene and an alpha-olefin comonomer in a first polymerisation step in the presence of a polymerisation catalyst to produce a first ethylene homo- or copolymer having a density of from 940 to 980 kg/m$^3$ and a melt flow rate MFR$_2$ of from 1 to 2000 g/10 min; (ii) homopolymerising ethylene or copolymerising ethylene and an alpha-olefin comonomer in a second polymerisation step in the presence of a first ethylene homo- or copolymer to produce a first ethylene polymer mixture comprising the first ethylene homo- or copolymer and a second ethylene homo- or copolymer, said first ethylene polymer mixture having a density of from 940 to 980 kg/m$^3$ and a melt flow rate MFR$_2$ of from 10 to 2000 g/10 min; (iii) copolymerising ethylene and an alpha-olefin comonomer in a third polymerisation step in the presence of the first ethylene polymer mixture to produce a second ethylene polymer mixture comprising the first ethylene polymer mixture and a third ethylene copolymer, said second ethylene polymer mixture having a density of from 915 to 965 kg/m$^3$, preferably from 930 to 955 kg/m$^3$ and a melt flow rate MFR$_5$ of from 0.2 to 10 g/10 min; (iv) providing a pipe having an outer surface layer; (v) applying a coating composition onto the pipe outer surface layer to form a top coat layer, wherein the coating composition comprises the second ethylene polymer mixture.

As seen from another aspect, the present invention provides a process for producing a coated pipe, comprising the steps of (i) homopolymerising ethylene or copolymerising ethylene and an alpha-olefin comonomer in a first polymerisation step in the presence of a polymerisation catalyst to produce a first ethylene homo- or copolymer having a density of from 940 to 980 kg/m$^3$ and a melt flow rate MFR$_2$ of from 1 to 2000 g/10 min; (ii) homopolymerising ethylene or copolymerising ethylene and an alpha-olefin comonomer in a second polymerisation step in the presence of a first ethylene homo- or copolymer to produce a first ethylene polymer mixture comprising the first ethylene homo- or copolymer and a second ethylene homo- or copolymer, said first ethylene polymer mixture having a density of from 940 to 980 kg/m$^3$ and a melt flow rate MFR$_2$ of from 5 to 2000 g/10 min; (iii) copolymerising ethylene and an alpha-olefin comonomer in a third polymerisation step in the presence of the first ethylene polymer mixture to produce a second ethylene polymer mixture comprising the first ethylene polymer mixture and a third ethylene copolymer, said second ethylene polymer mixture having a density of from 915 to 965 kg/m$^3$ and a melt flow rate MFR$_5$ of from 0.2 to 10 g/10 min; providing a pipe having an outer surface layer; and applying a coating composition comprising the second ethylene polymer mixture onto the outer surface layer of the pipe.

DETAILED DESCRIPTION

Polymerisation Process

The present process is directed to the polymerisation of ethylene and at least one α-olefin in multiple polymerisation steps in the presence of a polymerisation catalyst.

The at least one α-olefin may be selected from α-olefins having from 4 to 10 carbon atoms and their mixtures.

Especially suitable α-olefins are those having from 4 to 8 carbon atoms, including their mixtures. In particular 1-butene, 1-hexene and 1-octene and their mixtures are the preferred α-olefins. The α-olefin can be present in one or more polymerisation steps. If the α-olefin is present in more than one polymerisation step, the α-olefin used in the different polymerisation steps may be the same or different.

The polymerisation steps may be connected in any order, i.e. the first polymerisation step may precede the second polymerisation step, or the second polymerisation step may precede the first polymerisation step or, alternatively, polymerisation steps may be connected in parallel. However, it is preferred to operate the polymerisation steps in cascaded mode.

Catalyst

The polymerisation is conducted in the presence of an olefin polymerisation catalyst. The catalyst may be any catalyst which is capable of producing all components of the multimodal ethylene copolymer. Suitable catalysts are, among others, Ziegler-Natta catalysts based on a transition metal, such as titanium, zirconium and/or vanadium or metallocene catalysts or late transition metal catalysts, as well as their mixtures. Especially Ziegler-Natta catalysts are useful as they can produce polymers within a wide range of molecular weight and other desired properties with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has an average particle size from 15 to 30 μm, preferably from 18 to 25 μm. Alternatively, the support may have an average particle size of from 30 a 80 μm, preferably from 30 to 50 μm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another, especially preferred, group of suitable Ziegler-Natta catalysts contain a titanium compound together with a magnesium halide compound without an inert support. Thus, the catalyst contains a titanium compound on a magnesium dihalide, like magnesium dichloride. Such catalysts are disclosed, for instance, in WO-A-2005/118655 and EP-A-810235.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane, hexaisobutylaluminiumoxane and tetraisobutylaluminiumoxane. Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Prepolymerisation

The polymerisation steps may be preceded by a prepolymerisation step. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. The prepolymerisation step is conducted in slurry.

Thus, the prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from about 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all (separately or together) introduced to the prepolymerisation step when a prepolymerisation step is present. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

Typically, the amounts of hydrogen and comonomer are adjusted so that the presence of the prepolymer has no effect on the properties of the final multimodal polymer. Especially, it is preferred that melt flow rate of the prepolymer is greater than the melt flow rate of the final polymer but smaller than the melt flow rate of the polymer produced in the first polymerisation stage. It is further preferred that the density of the prepolymer is greater than the density of the final polymer. Suitably the density is approximately the same as or greater than the density of the polymer produced in the first polymerisation stage. Further, typically the amount of the prepolymer is not more than about 5% by weight of the multimodal polymer comprising the prepolymer.

First Polymerisation Step

The first polymerisation step typically operates at a temperature of from 20 to 150° C., preferably from 50 to 110° C. and more preferably from 60 to 100° C. The polymerisation may be conducted in slurry, gas phase or solution. In the first polymerisation step the first homo- or copolymer of ethylene is produced. The first ethylene homo- or copolymer has a density of from 940 to 980 kg/m$^3$ and a melt flow rate $MFR_2$ of from 1 to 2000 g/10 min.

The catalyst may be transferred into the first polymerisation step by any means known in the art. It is thus possible to suspend the catalyst in a diluent and maintain it as homogeneous slurry. Especially preferred it is to use oil having a viscosity form 20 to 1500 mPa·s as diluent, as disclosed in WO-A-2006/063771. It is also possible to mix the catalyst with a viscous mixture of grease and oil and feed the resultant paste into the first polymerisation step. Further still, it is possible to let the catalyst settle and introduce portions of thus obtained catalyst mud into the first polymerisation step in a manner disclosed, for instance, in EP-A-428054. The first polymerisation step may also be preceded by a prepolymerisation step, in which case the mixture withdrawn from the prepolymerisation step is directed into the first polymerisation step.

Into the first polymerisation step ethylene, optionally an inert diluent, and optionally hydrogen and/or the α-olefin are introduced. Hydrogen and the α-olefin, when present, are introduced in such amounts that the melt flow rate $MFR_2$ and the density of the first ethylene homo- or copolymer are in the desired values.

The polymerisation of the first polymerisation step may be conducted in slurry. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to about 50% by mole, preferably from about 1.5 to about 20% by mole and in particular from about 2 to about 15% by mole. The benefit of having a high ethylene concentration is that the productivity of the catalyst is increased but the drawback is that more ethylene then needs to be recycled than if the concentration was lower.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

When the first ethylene homo- or copolymer is produced in conditions where the ratio of the α-olefin to ethylene is not more than about 200 mol/kmol, such as not more than 100 mol/kmol, or not more than 50 mol/kmol, then it is usually advantageous to conduct the slurry polymerisation above the critical temperature and pressure of the fluid mixture. Such operation is described in U.S. Pat. No. 5,391,654.

When the first polymerisation step is conducted as slurry polymerisation the polymerisation in the first polymerisation step is conducted at a temperature within the range of from 50 to 115° C., preferably from 80 to 110° C. and in particular from 90 to 105° C. The pressure in the first polymerisation step is then from 1 to 300 bar, preferably from 40 to 100 bar.

The amount of hydrogen is adjusted based on the desired melt flow rate of the first ethylene homo- or copolymer and it depends on the specific catalyst used. For many generally used Ziegler-Natta catalysts the molar ratio of hydrogen to ethylene is from 10 to 2000 mol/kmol, preferably from 20 to 1000 mol/kmol and in particular from 40 to 800 mol/kmol.

The amount of the α-olefin is adjusted based on the desired density of the first ethylene homo- or copolymer and it, too, depends on the specific catalyst used. For many generally used Ziegler-Natta catalysts the molar ratio of the α-olefin to ethylene is from 0 to 1000 mol/kmol, preferably from 0 to 800 mol/kmol and in particular from 0 to 700 mol/kmol.

The polymerisation of the first polymerisation step may also be conducted in gas phase. A preferable embodiment of gas phase polymerisation reactor is a fluidised bed reactor. There the polymer particles formed in the polymerisation are suspended in upwards moving gas. The gas is introduced into the bottom part of the reactor. The upwards moving gas passes the fluidised bed wherein a part of the gas reacts in the presence of the catalyst and the unreacted gas is withdrawn from the top of the reactor. The gas is then compressed and cooled to remove the heat of polymerisation. To increase the cooling capacity it is sometimes desired to cool the recycle gas to a temperature where a part of the gas condenses. After cooling the recycle gas is reintroduced into the bottom of the reactor. Fluidised bed polymerisation reactors are disclosed, among others, in U.S. Pat. Nos. 4,994,534, 4,588,790, EP-A-699213, EP-A-628343, FI-A-921632, FI-A-935856, U.S. Pat. No. 4,877,587, FI-A-933073 and EP-A-75049.

In gas phase polymerisation using a Ziegler-Natta catalyst hydrogen is typically added in such amount that the ratio of hydrogen to ethylene is from 500 to 10000 mol/kmol, preferably from 1000 to 5000 mol/kmol, to obtain the desired molecular weight of the first homo- or copolymer of ethylene. Furthermore, the molar ratio of the α-olefin to ethylene is from 0 to 1000 mol/kmol, preferably from 0 to 500 mol/kmol and in particular from 0 to 300 mol/kmol.

According to one especially preferred embodiment the first ethylene homo- or copolymer is the first ethylene homopolymer. Then the α-olefin comonomer is preferably not introduced into the first polymerisation step. As the person skilled in the art understands minor amount of an α-olefin may anyway enter the first polymerisation step, either as an impurity in the diluent or as carry-over from the prepolymerisation step but such small amounts are not considered as introducing α-olefin comonomer into the first polymerisation step. In such cases the molar ratio of the α-olefin to ethylene is less than 20 mol/kmol, especially less than 10 mol/kmol and particularly in the area of from 0 to 5 mol/kmol.

According to a further preferred embodiment the first ethylene homo- or copolymer has $MFR_2$ of from 1 to 50 g/10 min, preferably from 5 to 30 g/10 min. Further preferred is then that the first ethylene homo- or copolymer is the first ethylene homopolymer. In this embodiment the molar ratio of the α-olefin to ethylene is less than 20 mol/kmol, especially less than 10 mol/kmol and particularly in the area of from 0 to 5 mol/kmol.

It is further preferred to produce the first ethylene homopolymer having $MFR_2$ of from 1 to 50 g/10 min, preferably from 5 to 30 g/10 min, in slurry polymerisation. Then the molar ratio of hydrogen to ethylene is suitably from 20 to 250 mol/kmol, preferably from 30 to 200 mol/kmol. Further, suitably the polymerisation is conducted at a temperature exceeding the critical temperature of the fluid mixture and pressure exceeding the critical pressure of the fluid mixture.

According to one more preferred embodiment the first ethylene homo- or copolymer has $MFR_2$ of from 100 to 1000 g/10 min, preferably from 200 to 800 g/10 min. Further preferred is then that the first ethylene homo- or copolymer is the first ethylene homopolymer. In this embodiment the molar ratio of the α-olefin to ethylene is less than 20 mol/kmol, especially less than 10 mol/kmol and particularly in the area of from 0 to 5 mol/kmol.

It is further preferred to produce the first ethylene homopolymer having $MFR_2$ of from 100 to 1000 g/10 min, preferably from 200 to 800 g/10 min, in slurry polymerisation. Then the molar ratio of hydrogen to ethylene is suitably from 250 to 1000 mol/kmol, preferably from 300 to 800 mol/kmol. Further, suitably the polymerisation is conducted at a temperature exceeding the critical temperature of the fluid mixture and pressure exceeding the critical pressure of the fluid mixture.

According to one embodiment the α-olefin is present in the first polymerisation step. When the α-olefin is present in the first polymerisation step the first ethylene homo- or copolymer is the first ethylene copolymer. Typically the density of the first ethylene copolymer is from 940 to 960 kg/m³, and preferably from 945 to 955 kg/m³. The polymerisation is preferably conducted as a slurry polymerisation in liquid diluent at a temperature of from 75° C. to 90° C., such as from 80 to 88° C. and a pressure of from 30 bar to 100 bar, such as from 40 to 80 bar, like from 50 to 80 bar. The molar ratio of the α-olefin to ethylene is then from 100 to 1000 mol/kmol, and preferably from 150 to 800 mol/kmol.

The polymerisation rate in the first polymerisation step is suitably controlled to achieve the desired amount of the first ethylene homo- or copolymer in the second ethylene polymer mixture. Preferably the second ethylene polymer mixture contains from 10 to 35% by weight, more preferably from 15 to 30% by weight and even more preferably from 16 to 26% by weight of the first ethylene homo- or copolymer. The polymerisation rate is suitably controlled by adjusting the ethylene concentration in the first polymerisation step. When the first polymerisation step is conducted as slurry polymerisation in the loop reactor the mole fraction of ethylene in the reaction mixture is suitably from 2 to 10% by mole and preferably from 3 to 8% by mole.

Second Polymerisation Step

The second homo- or copolymer of ethylene is produced in the second polymerisation step in the presence of the first homo- or copolymer of ethylene.

The second polymerisation step typically operates at a temperature of from 20 to 150° C., preferably from 50 to 110° C. and more preferably from 60 to 100° C. The polymerisation may be conducted in slurry, gas phase or solution. In the second polymerisation step the second homo- or copolymer of ethylene is produced in the presence of the first homo- or copolymer of ethylene. The first homo- or copolymer of ethylene and the second homo- or copolymer of ethylene together form the first ethylene polymer mixture. The first ethylene polymer mixture has a density of from 940 to 980 kg/m³ and a melt flow rate $MFR_2$ of from 10 to 2000 g/10 min.

The mixture containing the first homo- or copolymer of ethylene is transferred from the first polymerisation step to the second polymerisation step by using any method known to the person skilled in the art. If the first polymerisation step is conducted as slurry polymerisation in a loop reactor, it is advantageous to transfer the slurry from the first polymerisation step to the second polymerisation step by means of the pressure difference between the first polymerisation step and the second polymerisation step.

Into the second polymerisation step ethylene, optionally an inert diluent, and optionally hydrogen and/or the α-olefin are introduced. Hydrogen and the α-olefin, when present, are introduced in such amounts that the melt flow rate $MFR_2$ and the density of the first ethylene polymer mixture are in the desired values.

The polymerisation of the second polymerisation step may be conducted in slurry in the same way as it was discussed above for the first polymerisation step.

The amount of hydrogen in the second polymerisation step is adjusted based on the desired melt flow rate of the first ethylene polymer mixture and it depends on the specific catalyst used. For many generally used Ziegler-Natta catalysts the molar ratio of hydrogen to ethylene is from 100 to 2000 mol/kmol, preferably from 200 to 1000 mol/kmol and in particular from 300 to 800 mol/kmol.

The amount of the α-olefin is adjusted based on the desired density of the first ethylene polymer mixture and it, too, depends on the specific catalyst used. For many generally used Ziegler-Natta catalysts the molar ratio of the α-olefin to ethylene is from 0 to 1000 mol/kmol, preferably from 0 to 800 mol/kmol and in particular from 0 to 700 mol/kmol.

The polymerisation of the second polymerisation step may also be conducted in gas phase in the same way as was discussed above for the first polymerisation step.

According to one especially preferred embodiment the second ethylene homo- or copolymer is the second homopolymer of ethylene. Then the α-olefin comonomer is then preferably not introduced into the second polymerisation step.

In an especially preferred embodiment the first ethylene homo- or copolymer is the first ethylene homopolymer and the second ethylene homo- or copolymer is the second ethylene homopolymer. Then the α-olefin comonomer is preferably not introduced into the second polymerisation step. As the person skilled in the art understands minor amount of α-olefin may anyway enter the second polymerisation step, either as an impurity in the diluent or as carry-over from the first polymerisation step but such small amounts are not considered as introducing α-olefin comonomer into the second polymerisation step. In such cases the molar ratio of the α-olefin to ethylene is less than 20 mol/kmol, especially less than 10 mol/kmol and particularly in the area of from 0 to 5 mol/kmol.

According to one preferred embodiment the first ethylene homo- or copolymer has a density of from 940 to 980 kg/m$^3$ and a melt flow rate MFR$_2$ of from 100 to 1000 g/10 min and the first ethylene polymer mixture has a density of from 940 to 980 kg/m$^3$ and a melt flow rate MFR$_2$ of from 100 to 1000 g/10 min. Preferably still, the first ethylene homo- or copolymer is then the first ethylene homopolymer and the second ethylene homo- or copolymer is the second ethylene homopolymer. Thus, preferably no α-olefin is introduced into the first and the second polymerisation steps.

It is then preferred to conduct the second polymerisation step for producing the first ethylene polymer mixture having MFR$_2$ of from 100 to 1000 g/10 min, preferably from 200 to 800 g/10 min, in slurry polymerisation. Then the molar ratio of hydrogen to ethylene is suitably from 250 to 2000 mol/kmol, preferably from 300 to 1000 mol/kmol and in particular from 300 to 800 mol/kmol. Further, suitably the polymerisation is conducted at a temperature exceeding the critical temperature of the fluid mixture and pressure exceeding the critical pressure of the fluid mixture.

According to another preferred embodiment the first ethylene homo- or copolymer has a density of from 940 to 980 kg/m$^3$ and a melt flow rate MFR$_2$ of from 1 to 50 g/10 min, preferably from 5 to 30 g/10 min, and the first ethylene polymer mixture has a density of from 940 to 980 kg/m$^3$ and a melt flow rate MFR$_2$ of from MFR$_2$ of from 10 to 1000 g/10 min, preferably from 20 to 200 g/10 min. Preferably still, the first ethylene homo- or copolymer is then the first ethylene homopolymer and the second ethylene homo- or copolymer is the second ethylene homopolymer. Thus, preferably no α-olefin is introduced into the first and the second polymerisation steps.

It is then preferred to conduct the second polymerisation step for producing the first ethylene polymer mixture having MFR$_2$ of from 10 to 1000 g/10 min, preferably from 20 to 200 g/10 min, in slurry polymerisation. Then the molar ratio of hydrogen to ethylene is suitably from 250 to 2000 mol/kmol, preferably from 300 to 1000 mol/kmol and in particular from 300 to 800 mol/kmol. Further, suitably the polymerisation is conducted at a temperature exceeding the critical temperature of the fluid mixture and pressure exceeding the critical pressure of the fluid mixture.

According to an embodiment the α-olefin is present in the second polymerisation step. When the α-olefin is present in the second polymerisation step the second ethylene homo- or copolymer is the second ethylene copolymer. Typically the density of the second ethylene copolymer is from 945 to 960 kg/m$^3$, and preferably from 945 to 955 kg/m$^3$. The molar ratio of the α-olefin to ethylene is then from 100 to 1000 mol/kmol, and preferably from 150 to 800 mol/kmol.

According to one embodiment the α-olefin is present in the first polymerisation step, the second polymerisation step or both the first and the second polymerisation steps. When the α-olefin is present in at least one of the first and the second polymerisation steps the density of the first ethylene copolymer is controlled by the molar ratio of the α-olefin to ethylene in the first polymerisation step; or the density of the first ethylene polymer mixture is controlled by the molar ratio of the α-olefin to ethylene in the second polymerisation step; or the density of the first ethylene copolymer is controlled by the molar ratio of the α-olefin to ethylene in the first polymerisation step and the density of the first ethylene polymer mixture is controlled by the molar ratio of the α-olefin to ethylene in the second polymerisation step.

The polymerisation rate in the second polymerisation step is suitably controlled to achieve the desired amount of the second ethylene homo- or copolymer in the second ethylene polymer mixture. Preferably the second ethylene polymer mixture contains from 10 to 35% by weight, more preferably from 15 to 30% by weight and even more preferably from 16 to 26% by weight of the second ethylene homo- or copolymer. The polymerisation rate is suitably controlled by adjusting the ethylene concentration in the second polymerisation step. When the second polymerisation step is conducted as slurry polymerisation in the loop reactor the mole fraction of ethylene in the reaction mixture is suitably from 2 to 10% by mole and preferably from 3 to 8% by mole.

Third Polymerisation Step

In the third polymerisation step the second ethylene polymer mixture comprising the first ethylene polymer mixture and the third ethylene copolymer is formed.

Into the third polymerisation step are introduced ethylene, α-olefin having 4 to 10 carbon atoms, hydrogen and optionally an inert diluent. The polymerisation in third polymerisation step is conducted at a temperature within the range of from 50 to 100° C., preferably from 60 to 100° C. and in particular from 70 to 95° C. The pressure in the third polymerisation step is from 1 to 300 bar, preferably from 5 to 100 bar.

The polymerisation in the third polymerisation step may be conducted in slurry. The polymerisation may then be conducted along the lines as was discussed above for the first and second polymerisation steps.

The amount of hydrogen in the third polymerisation step is adjusted for achieving the desired melt flow rate of the second ethylene polymer mixture. The molar ratio of hydrogen to ethylene depends on the specific catalyst used. For many generally used Ziegler-Natta catalysts the molar ratio of hydrogen to ethylene is from 0 to 50 mol/kmol, preferably from 10 to 35 mol/kmol.

Furthermore, the amount of α-olefin having from 4 to 10 carbon atoms is adjusted to reach the targeted density. The ratio of the α-olefin to ethylene depends on the type of the catalyst and the type of the α-olefin. The ratio is typically from 100 to 1000 mol/kmol, preferably from 150 to 800 mol/kmol.

Alternatively, the polymerisation in the third polymerisation step may be, and preferably is, conducted in gas phase. In gas phase polymerisation using a Ziegler-Natta catalyst hydrogen is typically added in such amount that the ratio of hydrogen to ethylene is from 5 to 100 mol/kmol, preferably from 10 to 50 mol/kmol, for obtaining the desired melt index of the second ethylene polymer mixture. The amount of α-olefin having from 4 to 10 carbon atoms is adjusted to reach the targeted density of the second ethylene polymer mixture. The ratio of the α-olefin to ethylene is typically from 100 to 1000 mol/kmol, preferably from 150 to 800 mol/kmol.

The gas phase reactor preferably is a vertical fluidised bed reactor. There the polymer particles formed in the polymerisation are suspended in upwards moving gas. The gas is introduced into the bottom part of the reactor. The upwards moving gas passes the fluidised bed wherein a part of the gas reacts in the presence of the catalyst and the unreacted gas is withdrawn from the top of the reactor. The gas is then compressed and cooled to remove the heat of polymerisation. To increase the cooling capacity it is sometimes desired to cool the recycle gas to a temperature where a part of the gas condenses. After cooling the recycle gas is reintroduced into the bottom of the reactor. Fluidised bed polymerisation reactors are disclosed, among others, in U.S. Pat. Nos. 4,994,534, 4,588,790, EP-A-699213, EP-A-628343, FI-A-921632, FI-A-935856, U.S. Pat. No. 4,877,587, FI-A-933073 and EP-A-75049.

When the second polymerisation step is conducted in slurry and the third polymerisation step is conducted in gas phase, the polymer is suitably transferred from the second polymerisation step into the third polymerisation step as described in EP-A-1415999. The procedure described in paragraphs [0037] to [0048] of EP-A-1415999 provides an economical and effective method for product transfer.

The conditions in the third polymerisation step are adjusted so that the resulting second ethylene polymer mixture has $MFR_5$ of from 0.2 to 10 g/10 min, preferably from 0.2 to 5 g/10 min. Furthermore, the second ethylene polymer mixture has a density of from 915 to 965 kg/m$^3$.

The polymerisation rate in the third polymerisation step is suitably controlled to achieve the desired amount of the third ethylene copolymer in the second ethylene polymer mixture. Preferably the second ethylene polymer mixture contains from 40 to 70% by weight, more preferably from 50 to 65% by weight and even more preferably from 52 to 63% by weight of the third ethylene copolymer. The polymerisation rate is suitably controlled by adjusting the ethylene concentration in the third polymerisation step. When the third polymerisation step is conducted in gas phase the mole fraction of ethylene in the reactor gas is suitably from 3 to 50% by mole and preferably from 5 to 30% by mole.

In addition to ethylene, comonomer and hydrogen the gas also comprises an inert gas. The inert gas can be any gas which is inert in the reaction conditions, such as a saturated hydrocarbon having from 1 to 5 carbon atoms, nitrogen or a mixture of the above-mentioned compounds. Suitable hydrocarbons having from 1 to 5 carbon atoms are methane, ethane, propane, n-butane, isobutane, n-pentane, isopentane and mixtures thereof.

Post Reactor Treatment

When the polymer has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilisers, neutralisers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 180 to 230 kWh/ton. The melt temperature is typically from 220 to 290° C.

Preferred Compositions

According to a first preferred embodiment the second ethylene polymer mixture has $MFR_5$ of from 0.2 to 10 g/10 min, preferably from 0.2 to 5 g/10 min and a density of from 915 to 955 kg/m$^3$, preferably of from 920 to 950 kg/m$^3$. According to the same embodiment the first ethylene homo- or copolymer has a density of from 940 to 980 kg/m$^3$ and a melt flow rate $MFR_2$ of from 100 to 1000 g/10 min and the first ethylene polymer mixture has a density of from 940 to 980 kg/m$^3$ and a melt flow rate $MFR_2$ of from 100 to 1000 g/10 min. Preferably still, the first ethylene homo- or copolymer is then the first ethylene homopolymer and the second ethylene homo- or copolymer is the second ethylene homopolymer.

According to a second preferred embodiment the second ethylene polymer mixture has $MFR_5$ of from 0.2 to 10 g/10 min, preferably from 0.2 to 5 g/10 min and a density of from 920 to 955 kg/m$^3$, preferably of from 920 to 950 kg/m$^3$. According to the same embodiment the first ethylene homo- or copolymer has a density of from 940 to 980 kg/m$^3$ and a melt flow rate $MFR_2$ of from 1 to 50 g/10 min, preferably from 5 to 30 g/10 min, and the first ethylene polymer mixture has a density of from 940 to 980 kg/m$^3$ and a melt flow rate $MFR_2$ of from $MFR_2$ of from 10 to 1000 g/10 min, preferably from 20 to 200 g/10 min. Preferably still, the first ethylene homo- or copolymer is then the first ethylene homopolymer and the second ethylene homo- or copolymer is the second ethylene homopolymer.

According to a third preferred embodiment the second ethylene polymer mixture has $MFR_5$ of from 0.2 to 10 g/10 min, preferably from 0.5 to 5 g/10 min and a density of from 915 to 935 kg/m$^3$, preferably of from 918 to 930 kg/m$^3$. According to the same embodiment the first ethylene homo- or copolymer has a density of from 940 to 955 kg/m$^3$ and a melt flow rate $MFR_2$ of from 100 to 500 g/10 min and the first ethylene polymer mixture has a density of from 940 to 955 kg/m$^3$ and a melt flow rate $MFR_2$ of from 100 to 500 g/10 min. Preferably still, the first ethylene homo- or copolymer is then the first ethylene copolymer and the second ethylene homo- or copolymer is the second ethylene copolymer.

According to a fourth preferred embodiment the second ethylene polymer mixture has $MFR_5$ of from 0.2 to 10 g/10 min, preferably from 0.2 to 5 g/10 min and a density of from 915 to 935 kg/m³, preferably of from 918 to 930 kg/m³. According to the same embodiment the first ethylene homo- or copolymer has a density of from 940 to 955 kg/m³ and a melt flow rate $MFR_2$ of from 1 to 50 g/10 min, preferably from 5 to 30 g/10 min, and the first ethylene polymer mixture has a density of from 940 to 955 kg/m³ and a melt flow rate $MFR_2$ of from $MFR_2$ of from 10 to 600 g/10 min, preferably from 20 to 200 g/10 min. Preferably still, the first ethylene homo- or copolymer is then the first ethylene copolymer and the second ethylene homo- or copolymer is the second ethylene copolymer.

According to a fifth preferred embodiment the second ethylene polymer mixture has $MFR_5$ of from 0.2 to 10 g/10 min, preferably from 0.2 to 5 g/10 min and a density of from 930 to 955 kg/m³. According to the same embodiment the first ethylene homo- or copolymer has a density of from 940 to 980 kg/m³ and a melt flow rate $MFR_2$ of from 1 to 2000 g/10 min, preferably from 1 to 50 g/min alternatively from 100 to 1000 g/min and the first ethylene polymer mixture has a density of from 940 to 980 kg/m³ and a melt flow rate $MFR_2$ of from 10 to 2000 g/10 min, preferably from 10 to 200 g/10 min alternatively from 100 to 1000 g/min. Preferably still, the first ethylene homo- or copolymer is then the first ethylene homopolymer and the second ethylene homo- or copolymer is the second ethylene homopolymer.

Coated Pipe

A coated pipe typically comprises a top coat layer and a pipe surface layer. The coated pipe optionally also comprises a corrosion protective layer and an adhesive layer.

The second ethylene polymer mixture is used as a top coat layer in coating pipes, such as metal pipes and especially steel pipes. The top coat layer comprises the second ethylene polymer mixture and optional additives and other polymers. Preferably the top coat layer comprises from 80 to 100% by weight, more preferably from 85 to 100% by weight and in particular from 90 to 99% by weight of the second ethylene polymer mixture.

In addition to the second ethylene polymer mixture the top coat layer typically contains conventional additives known in the art. Such additives are, among others, antioxidants, process stabilizers, UV-stabilizers, pigments and acid scavengers.

Suitable antioxidants and stabilizers are, for instance, 2,6-di-tert-butyl-p-cresol, tetrakis-[methylene-3-(3',5-di-tert-butyl-4'hydroxyphenyl)propionate]methane, octadecyl-3-3(3'5'-di-tert-butyl-4'-hydroxyphenyl)propionate, dilaurylthiodipropionate, distearylthiodipropionate, tris-(nonylphenyl)phosphate, distearyl-pentaerythritol-diphosphite and tetrakis(2,4-di-tert-butylphenyl)-4,4'-biphenylene-diphosphonite.

Some hindered phenols are sold under the trade names of Irganox 1076 and Irganox 1010. Commercially available blends of antioxidants and process stabilizers are also available, such as Irganox B225 marketed by Ciba-Geigy.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight.

Preferably the carbon black is added as a masterbatch where it is premixed with a polymer, preferably high density polyethylene (HDPE), in a specific amount. Suitable masterbatches are, among others, HD4394, sold by Cabot Corporation, and PPM1805 by Poly Plast Muller. Also titanium oxide may be used as an UV-screener.

In addition the top coat layer may contain further polymers, such as carrier polymers used in additive masterbatches. The amount and nature of such polymers may be chosen freely within the limits discussed above as long as the properties of the coating composition are not negatively affected.

It is also possible to add a suitable amount of an adhesion polymer into the top coat layer to improve the adhesion between the pipe and the top coat layer. In this way the amount of the polymer used in the adhesion layer may be reduced and in some cases it may be possible to eliminate the adhesion layer altogether.

The pipe surface layer is the external surface layer of the pipe. The external surface layer is the surface which is in contact with the environment and an internal surface layer is in contact with the material flowing within the pipe.

It is preferable to properly prepare the surface layer of the pipe before coating in the manner known in the art. The pipe surface is typically inspected for any rust, dirt, flaws, discontinuities, and metal defects. All the excess material needs be removed from the pipe surface to make sure that the coating is properly adhered to the pipe. Suitable cleaning methods include air and water high pressure washing, grit or shot blasting and mechanical brushing. Also acid wash and chromate pre-treatment is sometimes used.

Materials that may be used in the corrosion protective layer are, for instance, epoxy resins and organosilicon compounds. Examples of suitable epoxy resins are phenol-based epoxies and amine-based epoxies. These kinds of epoxies are sold, among others, under trade names of EP8054 (of Teknos), Scotchkote 226N (of 3M) and Resicoat R-726 (of Akzo Nobel). Suitable organosilicon compounds have been disclosed in EP-A-1859926.

Typically the pipes are heated with induction heating up to about 220° C. for the application of the corrosion protective layer. The temperature is adjustable depending on the line speed and the material being used in the corrosion protective layer. When the epoxy Teknos EP 8054 is used the steel pipe is preferably heated to 190° C. The temperature decreases slightly during the coating process.

If epoxy powder (at 23° C.) is used in the corrosion protective layer it is typically sprayed on with epoxy guns, where the speed of the rotating pipe is about 9 m/min. The thickness of the epoxy and other coating materials are set in accordance with end use specified requirements. Normal thickness value for the epoxy layer (on-shore installations) is from 70 to 200 µm, such as 150 µm.

In the extrusion of the adhesive layer and the top coat layer, the pipe is rotated for covering the entire pipe surface with the adhesive layer and the top coat layer.

The extrusion of the adhesive layer and the top coat layer may be performed, for instance, with two single screw extruders. They may have a diameter of, for instance, from 30 to 100 mm, such as 60 mm, and a length of from 15 to 50 L/D, such as 30 L/D. The temperature is typically controlled in several zones and the temperature of the PE adhesive and the composition used for the top coat layer after the die is from 190 to 300° C., such as 220 and 220° C., respectively. Die widths are from 50 to 300 mm, such as 110 mm and 200 mm for the adhesive layer and coating layer, respectively. Both adhesive and the coating layer are usually rolled tightly onto the pipe with a silicone pressure roller. The thickness of the adhesive layer is typically from 200 to 400 µm, such as 290 µm. The thickness of the top coat layer (B) is typically from 1 to 5 mm, preferably from 2 to 4 mm, such as 3.2 mm.

Materials suitable to be used in the adhesion layer are, for instance, acid or acid anhydride grafted olefin polymers, like polyethylene or polypropylene. Suitable polymers are, among others, fumaric acid modified polyethylene, fumaric acid anhydride modified polyethylene, maleic acid modified polyethylene, maleic acid anhydride modified polyethylene, fumaric acid modified polypropylene, fumaric acid anhydride modified polypropylene, maleic acid modified polypropylene and maleic acid anhydride modified polypropylene. Examples of especially suitable adhesion plastics are given in EP-A-1316598.

After the coating the coated pipe is cooled, for instance by providing water flow on the coated pipe surface.

The coated pipes according to the present invention have improved mechanical properties, such as very high resistance to stress cracking. Further, the second ethylene polymer mixture contained in the top coat layer has a broad molecular weight distribution, allowing the coated pipes to be produced with high throughput and good production economy.

EXAMPLES

Methods
Melt Index, Melt Flow Rate, Flow Rate Ratio (MI, MFR, FRR):
Melt Index (MI) or Melt Flow Rate (MFR)

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.
Flow Rate Ratio (FRR)

The quantity FRR (flow rate ratio) is an indication of molecular weight distribution and denotes the ratio of flow rates at different loads. Thus, $FRR_{21/2}$ denotes the value of $MFR_{21}/MFR_2$.
Peel Strength Adhesion of polymer on steel was tested by Zwick/Roell ZO10 peel strength test equipment according to DIN 30670. A strip of 3 cm width is cut of the coating layer. The other end of the strip is fastened to pulling equipment and the pulling strength is measured during the peeling of the strip from the steel with a pulling speed of 10 mm/min. The results are expressed as N per cm. The peel strength was measured from the coatings produced at a screw speed of 95 RPM.
Pipe Coating A steel pipe with a diameter of 114 mm was cleaned to remove the excess material from its surface. The pipe was then heated with induction heating to 215° C. Epoxy powder (3M 226N) was then sprayed onto the pipe surface with the rotating speed of the line of 9 m/min so that the thickness of the epoxy layer was 150 µm. Then an adhesion plastic, a maleic acid anhydride grafted polyethylene adhesive, prepared according to composition 2 in EP 1 316 598 A1, was extruded onto the pipe by using a Barmag single screw extruder with an L/D ratio of 24 and a diameter of 45 mm and where the temperature of the melt after the die was 220° C. The die width was 110 mm. Simultaneously the composition of Example 1 was then extruded onto the adhesion layer by using a Krauss-Maffei extruder having a diameter of 45 mm and the L/D ratio of 30. The die width was 200 mm and the temperature of the melt after the die was 220° C. The pipe was rotated for covering the entire pipe surface with the polymer. The coating was conducted at extruder screw speeds of 25, 50 and 100 RPM. Extruder output (kg/h) was measured with each RPM level. Another way to measure material processability is winding speed test, which was carried out by running extruder with screw speed of 25 RPM and gradually increasing rotation speed of steel pipe until the melt film broke or maximum steel pipe rotation speed of 40 RPM was achieved.
Rheology Rheological parameters such as Shear Thinning Index SHI and Viscosity were determined by using a Anton Paar Phisica MCR 300 Rheometer on compression moulded samples under nitrogen atmosphere at 190° C. using 25 mm diameter plates and plate and plate geometry with a 1.2 mm gap. The oscillatory shear experiments were done within the linear viscosity range of strain at frequencies from 0.05 to 300 rad/s (ISO 6721-1). Five measurement points per decade were made.

The values of storage modulus (G'), loss modulus (G") complex modulus (G*) and complex viscosity ($\eta^*$) were obtained as a function of frequency ($\omega$). $\eta_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995).

SHI value is obtained by calculating the complex viscosities at given values of complex modulus and calculating the ratio of the two viscosities. For example, using the values of complex modulus of 1 kPa and 100 kPa, then $\eta^*(1\ kPa)$ and $\eta^*(100\ kPa)$ are obtained at a constant value of complex modulus of 1 kPa and 100 kPa, respectively. The shear thinning index $SHI_{1/100}$ is then defined as the ratio of the two viscosities $\eta^*(1\ kPa)$ and $\eta^*(100\ kPa)$, i.e. $\eta(1)/\eta(100)$.

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.
Density Density of the polymer was measured according to ISO 1183-2/1872-2B.
Tensile Strength Tensile strength properties were determined according to ISO 527-2. Compression moulded specimens of type 1A were used, which were prepared according to ISO 1872-2B.
Strain at Yield:

Strain at yield (in %) was determined according to ISO 527-2. The measurement was conducted at 23° C. temperature with an elongation rate of 50 mm/min.
Stress at Yield:

Stress at yield (in MPa) was determined according to ISO 527-2. The measurement was conducted at 23° C. temperature with an elongation rate of 50 mm/min.

Tensile Modulus

Tensile modulus (in MPa) was determined according to ISO 527-2. The measurement was conducted at 23° C. temperature with an elongation rate of 1 mm/min.

Tensile Break:

Tensile break was determined according to ISO 527-2. The measurement was conducted at 23° C. temperature with an elongation rate of 50 mm/min.

Example 1

A loop reactor having a volume of 50 dm$^3$ was operated at a temperature of 70° C. and a pressure of 58 bar. Into the reactor were fed ethylene, 1-butene, propane diluent and hydrogen so that the feed rate of ethylene was 2.0 kg/h, of 1-butene 80 g/h, of hydrogen was 5 g/h and of propane was 55 kg/h. Also a solid polymerization catalyst component produced as described above in Catalyst Preparation was introduced into the reactor together with triethylaluminium cocatalyst so that the molar ratio of Al/Ti was about 15. The estimated production rate was 1.3 kg/h.

A stream of slurry was continuously withdrawn and directed to a loop reactor having a volume of 150 dm$^3$ and which was operated at a temperature of 95° C. and a pressure of 55 bar. Into the reactor were further fed additional ethylene, propane diluent and hydrogen so that the ethylene concentration in the fluid mixture was 5.9% by mole, the hydrogen to ethylene ratio was 110 mol/kmol and the fresh propane feed was 35 kg/h. The production rate was 20 kg/h. The ethylene homopolymer withdrawn from the reactor had MFR$_2$ of 17 g/10 min and density of 972 kg/m$^3$.

A stream of slurry from the reactor was withdrawn intermittently and directed into a loop reactor having a volume of 350 dm$^3$ and which was operated at 95° C. temperature and 54 bar pressure. Into the reactor was further added a fresh propane, ethylene, and hydrogen so that the ethylene content in the reaction mixture was 5.7 mol-% and the molar ratio of hydrogen to ethylene was 360 mol/kmol. The ethylene polymer withdrawn from the reactor had MFR$_2$ of 56 g/10 min and density of 972 kg/m$^3$. The production rate was 20 kg/h.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 80° C. Additional ethylene, 1-butene comonomer, nitrogen as inert gas and hydrogen were added so that the ethylene content in the reaction mixture was 12 mol-%, the ratio of hydrogen to ethylene was 42 mol/kmol and the molar ratio of 1-butene to ethylene was 240 mol/kmol. The polymer production rate in the gas phase reactor was 52 kg/h and thus the total polymer withdrawal rate from the gas phase reactor was about 93 kg/h. The polymer had a melt flow rate MFR$_5$ of 2.8 g/10 min and a density of 938 kg/m$^3$. The production split (weight-% prepolymer/weight-% 1st stage component/weight-% 2nd stage component/weight-% 3rd stage component) was 1/22/21/6.

The polymer powder was mixed under nitrogen atmosphere with 1000 ppm of Ca-stearate, 3200 ppm of Irganox B225 and 5.8% by weight of a carbon black masterbatch containing about 40% by weight of carbon black. Then it was compounded and extruded under nitrogen atmosphere to pellets by using a CIMP90 twin screw extruder so that the SEI was 200 kWh/ton and the melt temperature 250° C. The pelletised resin had a melt flow rate MFR$_5$ of 2.5 g/10 min, a density of 947 kg/m$^3$ and an SHI(2.7/210) of 15.

Example 2

The procedure of Example 1 was repeated except that the conditions in the loop reactor having the volume of 150 dm$^3$ were changed so that the ratio of hydrogen to ethylene in the reactor was 410 mol/kmol and the ethylene concentration was 5.0 mol-%. The resulting homopolymer had MFR$_2$ of 380 g/10 min. The ratio of 1-butene to ethylene was 10 mol/kmol (due to a carry-over from the prepolymeriser). The conditions in the loop reactor having the volume of 350 dm$^3$ were changed so that the ratio of hydrogen to ethylene in the reactor was 420 mol/kmol and the ethylene concentration was 4.8 mol-%. The resulting homopolymer mixture had MFR$_2$ of 420 g/10 min. The ratio of 1-butene to ethylene was 5 mol/kmol (due to a carry-over from the previous reactor). Finally, the conditions in the gas phase reactor were adjusted so that the ratio of hydrogen to ethylene in the reactor was 26 mol/kmol, ratio of 1-butene to ethylene was 420 mol/kmol and the ethylene concentration was 18 mol-%. The second ethylene polymer mixture had MFR$_2$ of 0.52 g/10 min, MFR$_5$ of 2.3 g/10 min and the density 939 kg/m$^3$. The resin was pelletised as described in Example 1 and the resulting material had MFR$_2$ of 0.54 g/10 min, a density 950 kg/m$^3$ and an SHI(2.7/210) of 23.

Comparative Example 1

A loop reactor having a volume of 50 dm$^3$ was operated at a temperature of 70° C. and a pressure of 65 bar. Into the reactor were fed ethylene, 1-butene, propane diluent and hydrogen so that the feed rate of ethylene was 2.0 kg/h, of 1-butene 80 g/h, of hydrogen was 5 g/h and of propane was 55 kg/h. Also a solid polymerization catalyst component produced as described above in Catalyst Preparation was introduced into the reactor together with triethylaluminium cocatalyst so that the molar ratio of Al/Ti was about 15. The estimated production rate was 1.3 kg/h.

A stream of slurry was continuously withdrawn and directed to a loop reactor having a volume of 500 dm$^3$ and which was operated at a temperature of 95° C. and a pressure of 64 bar. Into the reactor were further fed additional ethylene, propane diluent and hydrogen so that the ethylene concentration in the fluid mixture was 5.5% by mole, the hydrogen to ethylene ratio was 470 mol/kmol and the fresh propane feed was 26 kg/h. The production rate was 41 kg/h. The ethylene homopolymer withdrawn from the reactor had MFR$_2$ of 390 g/10 min and density of 972 kg/m$^3$.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 80° C. Additional ethylene, 1-butene comonomer, nitrogen as inert gas and hydrogen were added so that the ethylene content in the reaction mixture was 16 mol-%, the ratio of hydrogen to ethylene was 24 mol/kmol and the molar ratio of 1-butene to ethylene was 420 mol/kmol. The polymer production rate in the gas phase reactor was 51 kg/h and thus the total polymer withdrawal rate from the gas phase reactor was about 93 kg/h. The polymer had a melt flow rate MFR$_5$ of 2.6 g/10 min and a density of 939 kg/m$^3$. The production split (weight-% prepolymer/weight-% 1st stage component/weight-% 2nd stage component) was 1/44/55.

The polymer powder was mixed under nitrogen atmosphere with 1000 ppm of Ca-stearate, 3200 ppm of Irganox B225 and 5.8% by weight of a carbon black masterbatch containing about 40% by weight of carbon black. Then it was compounded and extruded under nitrogen atmosphere to pellets by using a CIMP90 twin screw extruder so that the SEI was 200 kWh/ton and the melt temperature 250° C. The pelletised resin had a melt flow rate $MFR_5$ of 2.4 g/10 min and a density of 948 kg/m$^3$ and an SHI(2.7/210) of 25.

Example 4

The compositions produced in Example 1, Example 2 and Comparative Example 1 were used in pipe coating as described above. The maximum winding speed with which the coating could be applied in a stable manner, adhesion at 23° C. and 80° C., elongation at break and stress at break were determined from the coatings. The results are given in the Table 1 below.

TABLE 1

Data of pipe coating and adhesion

| Composition | E1 | E2 | CE1 |
|---|---|---|---|
| Extruder output with 25 rpm (kg/h) | 19.5 | 19 | 18.5 |
| Extruder output with 50 rpm (kg/h) | 38.8 | 37.1 | 36.6 |
| Extruder output with 100 rpm (kg/h) | 73.8 | 72.2 | 71.8 |
| Max. winding speed (m/min) | >40 | 37 | 32 |
| Adhesion +23° C., max (N/cm) | 528 | 563 | 495 |
| Adhesion +80° C., max (N/cm) | 215 | 222 | 196 |
| Elongation at break at −45° C. (%) | 496 | 465 | 375 |
| Elongation at break at +23° C. (%) | >700 | >700 | >700 |

Example 5

The procedure of Example 1 was repeated except that the conditions in the loop reactor having the volume of 150 dm$^3$ were changed so that the ratio of hydrogen to ethylene in the reactor was 100 mol/kmol and the ethylene concentration was 5.6 mol-%. The resulting homopolymer had $MFR_2$ of 16 g/10 min. The ratio of 1-butene to ethylene was 5 mol/kmol (due to a carry-over from the prepolymeriser).

The conditions in the loop reactor having the volume of 350 dm$^3$ were changed so that the ratio of hydrogen to ethylene in the reactor was 350 mol/kmol and the ethylene concentration was 5.8 mol-%. The resulting homopolymer had $MFR_2$ of 43 g/10 min. The ratio of 1-butene to ethylene was 3 mol/kmol (due to a carry-over from the previous reactor).

The conditions in the gas phase reactor were adjusted so that the ratio of hydrogen to ethylene in the reactor was 29 mol/kmol, ratio of 1-butene to ethylene was 250 mol/kmol and the ethylene concentration was 13 mol-%. The second ethylene polymer mixture had $MFR_5$ of 2.3 g/10 min and the density 940 kg/m$^3$. The production split (weight-% prepolymer/weight-% 1st stage component/weight-% 2nd stage component/weight-% 3rd stage component) was 1/25/23/51. The resin was pelletised as described in Example 1 and the resulting material had $MFR_5$ of 2.2 g/10 min and the density 952 kg/m$^3$ and an SHI(2.7/210) of 18.

Example 6

The procedure of Example 1 was repeated except that the conditions in the loop reactor having the volume of 150 dm$^3$ were changed so that the ratio of hydrogen to ethylene in the reactor was 290 mol/kmol and the ethylene concentration was 4.9 mol-%. 1-butene was added to the reactor so that the ratio of 1-butene to ethylene was 540 mol/kmol. The resulting copolymer had $MFR_2$ of 300 g/10 min and a density of 946 kg/m$^3$.

The conditions in the loop reactor having the volume of 350 dm$^3$ were changed so that the ratio of hydrogen to ethylene in the reactor was 310 mol/kmol and the ethylene concentration was 5.3 mol-%. 1-butene was added to the reactor so that the ratio of 1-butene to ethylene was 570 mol/kmol. The resulting copolymer had $MFR_2$ of 290 g/10 min and the density 948 kg/m$^3$.

The conditions in the gas phase reactor were adjusted so that the ratio of hydrogen to ethylene in the reactor was 20 mol/kmol, ratio of 1-butene to ethylene was 960 mol/kmol and the ethylene concentration was 26 mol-%. The second ethylene polymer mixture had $MFR_5$ of 1.1 g/10 min and the density 919 kg/m$^3$. The production split (weight-% prepolymer/weight-% 1st stage component/weight-% 2nd stage component/weight-% 3rd stage component) was 1/22/22/55. The resin was pelletised as described in Example 1 and the resulting material had $MFR_5$ of 1.0 g/10 min and the density 934 kg/m$^3$ and an SHI (2.7/210) of 29.

Example 7

The procedure of Example 1 was repeated except that the conditions in the loop reactor having the volume of 150 dm$^3$ were changed so that the ratio of hydrogen to ethylene in the reactor was 470 mol/kmol and the ethylene concentration was 6.0 mol-%. The resulting homopolymer had $MFR_2$ of 370 g/10 min. The ratio of 1-butene to ethylene was 10 mol/kmol (due to a carry-over from the prepolymeriser).

The conditions in the loop reactor having the volume of 350 dm$^3$ were changed so that the ratio of hydrogen to ethylene in the reactor was 420 mol/kmol and the ethylene concentration was 5.1 mol-%. The resulting copolymer had $MFR_2$ of 350 g/10 min. The ratio of 1-butene to ethylene was 8 mol/kmol (due to a carry-over from the previous reactor).

The conditions in the gas phase reactor were adjusted as follows: A mixture of 1-butene and 1-hexene was used as the comonomer so that the mixture fed into the gas phase reactor contained 20 weight-% 1-butene and 80 weight-% 1-hexene. The ratio of hydrogen to ethylene in the fluidisation gas was 13 mol/kmol, the ratio of 1-butene to ethylene was 150 mol/kmol and the ratio of 1-hexene to ethylene was 160 mol/kmol. The ethylene concentration was 16 mol-%. The second ethylene polymer mixture had $MFR_5$ of 0.9 g/10 min and the density 930 kg/m$^3$. The production split (weight-% prepolymer/weight-% 1st stage component/weight-% 2nd stage component/weight-% 3rd stage component) was 1/17/19/63. The resin was pelletised as described in Example 1 without the carbon black masterbatch addition and the resulting material had $MFR_5$ of 0.8 g/10 min, the density 933 kg/m$^3$ and an SHI(2.7/210) of 32.

Example 8

The procedure of Example 1 was repeated except that the conditions in the loop reactor having the volume of 150 dm$^3$ were changed so that the ratio of hydrogen to ethylene in the reactor was 430 mol/kmol and the ethylene concentration was 4.8 mol-%. The resulting homopolymer had MFR$_2$ of 430 g/10 min. The ratio of 1-butene to ethylene was 9 mol/kmol (due to a carry-over from the prepolymeriser).

The conditions in the loop reactor having the volume of 350 dm$^3$ were changed so that the ratio of hydrogen to ethylene in the reactor was 500 mol/kmol and the ethylene concentration was 5.3 mol-%. The resulting copolymer had MFR$_2$ of 360 g/10 min. The ratio of 1-butene to ethylene was 7 mol/kmol (due to a carry-over from the previous reactor).

The conditions in the gas phase reactor were adjusted as follows: A mixture of 1-butene and 1-hexene was used as the comonomer so that the mixture fed into the gas phase reactor contained 20 weight-% 1-butene and 80 weight-% 1-hexene. The ratio of hydrogen to ethylene in the fluidisation gas was 33 mol/kmol, the ratio of 1-butene to ethylene was 110 mol/kmol and the ratio of 1-hexene to ethylene was 160 mol/kmol. The ethylene concentration was 18 mol-%. The second ethylene polymer mixture had MFR$_5$ of 2.0 g/10 min and the density 936 kg/m$^3$. The production split (weight-% prepolymer/weight-% 1st stage component/weight-% 2nd stage component/weight-% 3rd stage component) was 1/20/20/59. The resin was pelletised as described in Example 1 without the carbon black masterbatch addition and the resulting material had MFR$_5$ of 2.1 g/10 min, the density 937 kg/m$^3$ and an SHI(2.7/210) of 25.

Example 9

The procedure of Example 1 was repeated except that the conditions in the loop reactor having the volume of 150 dm$^3$ were changed so that the ratio of hydrogen to ethylene in the reactor was 440 mol/kmol and the ethylene concentration was 6.3 mol-%. The resulting homopolymer had MFR$_2$ of 320 g/10 min. The ratio of 1-butene to ethylene was 8 mol/kmol (due to a carry-over from the prepolymeriser).

The conditions in the loop reactor having the volume of 350 dm$^3$ were changed so that the ratio of hydrogen to ethylene in the reactor was 480 mol/kmol and the ethylene concentration was 5.1 mol-%. The resulting homopolymer had MFR$_2$ of 360 g/10 min. The ratio of 1-butene to ethylene was 7 mol/kmol (due to a carry-over from the previous reactor).

The conditions in the gas phase reactor were adjusted so that the ratio of hydrogen to ethylene in the reactor was 38 mol/kmol, ratio of 1-butene to ethylene was 220 mol/kmol and the ethylene concentration was 13 mol-%. The second ethylene polymer mixture had MFR$_5$ of 2.0 g/10 min and the density 945 kg/m$^3$. The production split (weight-% prepolymer/weight-% 1st stage component/weight-% 2nd stage component/weight-% 3rd stage component) was 1/21/22/56. The resin was pelletised as described in Example 1 without carbon black masterbatch addition and the resulting material had MFR$_5$ of 1.9 g/10 min, the density 946 kg/m$^3$ and an SHI(2.7/210) of 20.

Example 10

The compositions produced in Example s 5-9 were used in pipe coating as described above. Adhesion at 23° C. and 80° C. were determined from the coatings. The results are given in the Table below.

| Example | Adhesion 23° C., max (N/cm) | Adhesion 80° C., max (N/cm) |
| --- | --- | --- |
| #5 | 484 | 221 |
| #6 | No peeling before yield | 217 |
| #7 | 557 | 167 |
| #8 | 419 | 193 |
| #9 | 418 | 170 |

What is claimed is:

1. A process for producing a coated pipe, the process comprising the steps of:
   (i) homopolymerising ethylene or copolymerising ethylene and an α-olefin comonomer in a first polymerisation step in the presence of a polymerisation catalyst to produce a first ethylene homo- or copolymer having a density of from 940 to 980 kg/m$^3$ and a melt flow rate MFR$_2$ of from 1 to 2000 g/10 min;
   (ii) homopolymerising ethylene or copolymerising ethylene and an α-olefin comonomer in a second polymerisation step in the presence of a first ethylene homo- or copolymer to produce a first ethylene polymer mixture comprising the first ethylene homo- or copolymer and a second ethylene homo- or copolymer, the first ethylene polymer mixture having a density of from 940 to 980 kg/m$^3$ and a melt flow rate MFR$_2$ of from 10 to 2000 g/10 min;
   (iii) copolymerising ethylene and an α-olefin comonomer in a third polymerisation step in the presence of the first ethylene polymer mixture to produce a second ethylene polymer mixture comprising the first ethylene polymer mixture and a third ethylene copolymer, the second ethylene polymer mixture having a density of from 930 to 955 kg/m$^3$ and a melt flow rate MFR$_5$ of from 0.2 to 10 g/10 min;
   (iv) providing a pipe having an outer surface layer; and
   (v) applying a coating composition onto the pipe outer surface layer to form a top coat layer, wherein the coating composition comprises the second ethylene polymer mixture.

2. The process according to claim 1 wherein the α-olefin comonomer is selected from the group consisting of α-olefins having from 4 to 10 carbon atoms and their mixtures.

3. The process according to claim 1 wherein at least one of the first and the second polymerisation step is conducted as a slurry polymerisation in a loop reactor or the third polymerisation step is conducted in gas phase or at least one of the first and the second polymerisation step is conducted as a slurry polymerisation in a loop reactor and the third polymerisation step is conducted in gas phase.

4. The process according to claim 3 wherein the slurry polymerisation comprises a diluent, and the diluent in the slurry polymerisation comprises at least 90% of hydrocarbons having from 3 to 5 carbon atoms.

5. The process according to claim 1 wherein the second ethylene polymer mixture comprises from 10 to 35% by weight of the first ethylene homo- or copolymer, from 10 to 35% by weight of the second ethylene homo- or copolymer and from 45 to 70% by weight of the third ethylene copolymer.

6. The process according to claim 5 wherein the second ethylene polymer mixture comprises from 16 to 26% by weight of the first ethylene homo- or copolymer, from 16 to 26% by weight of the second ethylene homo- or copolymer and from 50 to 65% by weight of the third ethylene copolymer.

7. The process according to claim 1 wherein the first ethylene homo- or copolymer has a density of from 940 to 980 kg/m³ and a melt flow rate MFR$_2$ of from 100 to 1000 g/10 min and the first ethylene polymer mixture has a density of from 940 to 980 kg/m³ and a melt flow rate MFR$_2$ of from 100 to 1000 g/10 min.

8. The process according to claim 7 wherein the first ethylene homo- or copolymer is an ethylene homopolymer and the second ethylene homo- or copolymer is an ethylene homopolymer.

9. The process according to claim 1 wherein the first ethylene homo- or copolymer has a density of from 940 to 980 kg/m³ and a melt flow rate MFR$_2$ of from 1 to 50 g/10 min, and the first ethylene polymer mixture has a density of from 940 to 980 kg/m³ and a melt flow rate MFR$_2$ of from 10 to 200 g/10 min.

10. The process according to claim 9 wherein the first ethylene homo- or copolymer is an ethylene homopolymer and the second ethylene homo- or copolymer is an ethylene homopolymer.

11. The process according to claim 1 wherein the second ethylene polymer mixture has a density of from 930 to 940 kg/m³, the first ethylene homo- or copolymer has a density of from 940 to 955 kg/m³ and a melt flow rate MFR$_2$ of from 100 to 500 g/10 min, and the first ethylene polymer mixture has a density of from 940 to 955 kg/m³ and a melt flow rate MFR$_2$ of from 100 to 500 g/10 min.

12. The process according to claim 1 wherein a corrosion protective layer is applied onto the pipe outer surface before coating it with the top coat layer.

13. The process according to claim 12 wherein an adhesive layer is applied onto the corrosion protective layer before coating it with the top coat layer.

14. The process according to claim 1 further comprising the steps of:
- rotating the pipe; and
- extruding an adhesive layer and the top coat layer onto the pipe.

* * * * *